US008316225B2

(12) United States Patent
Yukawa et al.

(10) Patent No.: US 8,316,225 B2

(45) Date of Patent: Nov. 20, 2012

(54) AUTOMATED INTEGRATION OF FAULT REPORTING

(75) Inventors: Steven J Yukawa, Seattle, WA (US); Tim W Anstey, Seattle, WA (US); Steven R Ecola, Sammamish, WA (US); David L Allen, Kent, WA (US)

(73) Assignee: The Boeing Company, Chicago, IL (US)

( * ) Notice: Subject to any disclaimer, the term of this patent is extended or adjusted under 35 U.S.C. 154(b) by 849 days.

(21) Appl. No.: 11/191,645

(22) Filed: Jul. 28, 2005

(65) Prior Publication Data

US 2007/0028089 A1 Feb. 1, 2007

(51) Int. Cl.
*H04L 9/00* (2006.01)
*H04B 1/69* (2011.01)

(52) U.S. Cl. ....... 713/150; 455/67.11; 455/98; 455/431; 342/36; 709/224; 709/225; 701/33.4

(58) Field of Classification Search .................... 455/98, 455/431, 66, 67.11; 342/36; 709/224–225; 713/150, 151; 701/33.4
See application file for complete search history.

(56) References Cited

U.S. PATENT DOCUMENTS 6,148,179 A * 11/2000 Wright et al. ................ 455/66.1
6,173,159 B1 * 1/2001 Wright et al. ................ 455/66.1
6,201,797 B1 * 3/2001 Leuca et al. .................. 370/316
6,253,129 B1 6/2001 Jenkins et al.
6,275,497 B1 * 8/2001 Varma et al. .................. 370/431
6,353,734 B1 * 3/2002 Wright et al. .................... 455/98
6,516,192 B1 * 2/2003 Spaur et al. ................... 455/450
6,760,778 B1 * 7/2004 Nelson et al. ................. 709/246
6,816,728 B2 * 11/2004 Igloi et al. .................... 455/431
7,039,510 B2 5/2006 Gumpinger
7,149,612 B2 * 12/2006 Stefani et al. .................... 701/35
7,177,939 B2 * 2/2007 Nelson et al. ................. 709/230

(Continued)

FOREIGN PATENT DOCUMENTS

DE 203 19 116 U1 8/2004
WO WO 01/50728 A1 7/2001

OTHER PUBLICATIONS

Cellular Networking Perspectives, 2002, http://www.cnp-wireless.com/ArticleArchive/Wireless20Telecom/2002Q3-SMSIntrworking.htm.

(Continued)

*Primary Examiner* — Yin-Chen Shaw

(74) *Attorney, Agent, or Firm* — Harness, Dickey & Pierce, P.L.C.

(57) ABSTRACT

A system and method are provided for establishing a communication link between an on onboard computer system (OCS) of a mobile platform and a central computer system (CCS) located remotely from the mobile platform. A message containing data to be downloaded from the OCS to the CCS is sent from a first portion of an electronic log book function (ELB1) of the OCS to a second portion of a communications management function (CMF2) of the OCS. The message is configured into a transmittable data file and placed into an outgoing queue of the CMF2. The CMF2 automatically selects at least one desired communication channel from a plurality of available communication channels utilizing a configuration file of the CMF2. The CMF2 establishes a secure link between the OCS and the CCS utilizing the automatically selected communication channel and sends the transmittable data file to the CCS, via the secure established link over the automatically selected channel.

18 Claims, 3 Drawing Sheets

U.S. PATENT DOCUMENTS

| | | | | |
|---|---|---|---|---|
| 7,260,389 | B2 * | 8/2007 | Allen et al. | 455/419 |
| 7,617,029 | B2 * | 11/2009 | Loda | 701/33 |
| 7,689,329 | B2 * | 3/2010 | Avery et al. | 701/14 |
| 2003/0030581 | A1 * | 2/2003 | Roy | 342/36 |
| 2005/0003816 | A1 | 1/2005 | Vardoulias et al. | |
| 2005/0148327 | A1 | 7/2005 | Perez et al. | |
| 2005/0181787 | A1 * | 8/2005 | Judd et al. | 455/431 |

OTHER PUBLICATIONS

Wireless Messaging Suite, Mobile Messaging Platform, undated but effective as of Jul. 7, 2005; http://www.hssworld.com/commapps/smsc/faq.htm.

Flextronics Software Systems, FAQs; http://www.hssworld.com/commapps/smsc/faq.htm, undated—web site last updated May 3, 2004 and effective as of Jul. 7, 2005.

Core—Free FTP client software—Core FTP LE; http://www.coreftp.com, Web site © 2003 Cre FTP; site effective as of Jul. 7, 2005.

Tucows, PC Police Professional; http://www.tucows.com/preview/342212, article undated but effective Jul. 7, 2005; web site © 2005.

Download Managers—Free Software; http://freeware.intrastar.net/downloads.htm, undated—Links active as of Sep. 4, 2004; effective Jul. 7, 2005; site © 1997-2004.

Microsoft Office Online, About e-mailk security; 2005; http://office.microsoft.com/en-us/assistance/HP030834341033.aspx.

* cited by examiner

AUTOMATED INTEGRATION OF FAULT REPORTING

FIELD OF INVENTION

The invention relates generally to the transfer of mobile platform metrics and fault data from logbooks utilized onboard the mobile platform to ground based systems during mobile platform operations or when the mobile platform reaches its destination. More particularly, the invention relates to transferring such data between an electronic logbook onboard the mobile platform and the ground based systems.

BACKGROUND OF THE INVENTION

Airlines and other mobile platform providers, such as companies that provide passenger and/or cargo transportation by bus, train or ship, often maintain travel metrics and fault data during operation of the mobile platform. Metrics data generally include information and data regarding such things as origin and destination information for the mobile platform, passenger information and flight crew information, travel times, fueling information, etc. Fault data generally include data detailing problems with the mobile platform that were detected during the operation of the mobile platform. This fault data is used to determine whether the mobile platform meets regulatory and operational requirements and can be re-dispatched or redeployed.

Often, the metric and fault data are recorded by hand on preprinted forms during operation of the mobile platform and maintained in metrics and maintenance logbooks. The logbooks are generally carried off the mobile platform by crew of the mobile platform when the mobile platform reaches a mobile platform terminal at its destination. The metrics and fault data are then keyed into a ground based computer system to be stored in an electronic database. The ground based computer system may include a "master" logbook database, operational decision aid systems, e.g. mobile platform health management systems, and/or data repository systems, e.g. maintenance history systems. Often the forms can be multi-part forms where each part goes to a different department at the mobile platform terminal. Additionally, corrective maintenance actions taken to address the fault reports need to be recorded in the logbooks to be available to crew members of the mobile platform when the mobile platform departs from the terminal for another destination. Such data entry tasks are time consuming and provide data to using systems after significant time delay. Furthermore, this paper logbook process is labor intensive and has significant inefficiencies inherent in the process. Further yet, faults may occur during high workload periods on the mobile platform causing the mobile platform operators to delay recording or not record certain information, such as fault codes that allow direct correlation to system generated fault messages. Such delayed or non recording can inhibit timely clearing of the fault condition by the mobile platform maintenance crew.

Recently, some mobile platform providers have implemented electronic metrics and fault data recordation and maintenance systems where an electronic logbook is utilized. The electronic logbook includes electronic forms that are utilized by crew onboard the mobile platform during operation of the mobile platform. Although the electronic logbooks increase efficiency, they, too, generally need to be removed from the mobile platform to download the data to the ground based computer system and stored in electronic databases. The ground based systems can provide the capability to efficiently process metrics and fault information and can help prioritize which faults should be addressed and to identify the particular maintenance procedure needed to address the particular fault report. Since the clearing of a fault may be required to dispatch the mobile platform on another mission, this delay can affect the schedule of operation of the mobile platform.

With the prevalence of contemporary communication, downloading the metrics and fault data from the electronic logbooks to the ground based systems while the electronic logbooks remain on board the mobile platforms is possible. However, mobile platforms move throughout the country and the world with a variety of electronic communication connectivity options and availability en-route and at each mobile platform terminal. For example, connectivity at certain mobile platform terminals may employ IEEE 802.11 or global packet radio service (GPRS) wireless protocols, while other terminals may employ VHF and satellite networks. Yet other terminals may utilize broadband satellite networks and still other terminals may not have communication connectivity availability, but instead may use a direct wired connection. VHF and satellite communications are available for transfer of data while the mobile platform is en-route.

Therefore, there is a need to move mobile platform metrics and fault data and maintenance records between such electronic logbooks and the ground based mobile platform terminal systems in an efficient, repeatable and secure automated manner.

BRIEF SUMMARY OF THE INVENTION

In various embodiments of the present invention a system and method are provided for establishing a communication link between an onboard computer system (OCS) of a mobile platform and a central computer system (CCS) located remotely from the mobile platform. The method includes sending a message containing data to be downloaded from the OCS to the CCS from a first portion of an electronic log book function (ELB1) of the OCS to a second portion of a communications management function (CMF2) of the OCS. Execution of the ELB1 and CMF2 configures the message into a transmittable data file that can be communicated to the CCS using any suitable Internet protocol and places the transmittable data file into an outgoing queue of the CMF2. The CMF2 automatically selects at least one desired communication channel from a plurality of available communication channels utilizing a configuration file of the CMF2. The configuration file includes a plurality of desired communication channels that the OCS can utilize to communicate with the CCS. Execution of the CMF2 further establishes a secure link between the OCS and the CCS utilizing the automatically selected communication channel. The CMF2 then sends the transmittable data file containing the data message to a first portion of a communications management function (CMF1) included in the CCS, via the secure established link over the automatically selected channel.

The features, functions, and advantages of the present invention can be achieved independently in various embodiments of the present inventions or may be combined in yet other embodiments.

BRIEF DESCRIPTION OF THE DRAWINGS

The present invention will become more fully understood from the detailed description and accompanying drawings, wherein.

Corresponding reference numerals indicate corresponding parts throughout the several views of drawings.

DETAILED DESCRIPTION OF THE INVENTION

The following descriptions of various embodiments are merely exemplary in nature and are in no way intended to limit the invention, its application or uses. Additionally, the advantages provided by the preferred embodiments, as described below, are exemplary in nature and not all preferred embodiments provide the same advantages or the same degree of advantages.

Figure 1:
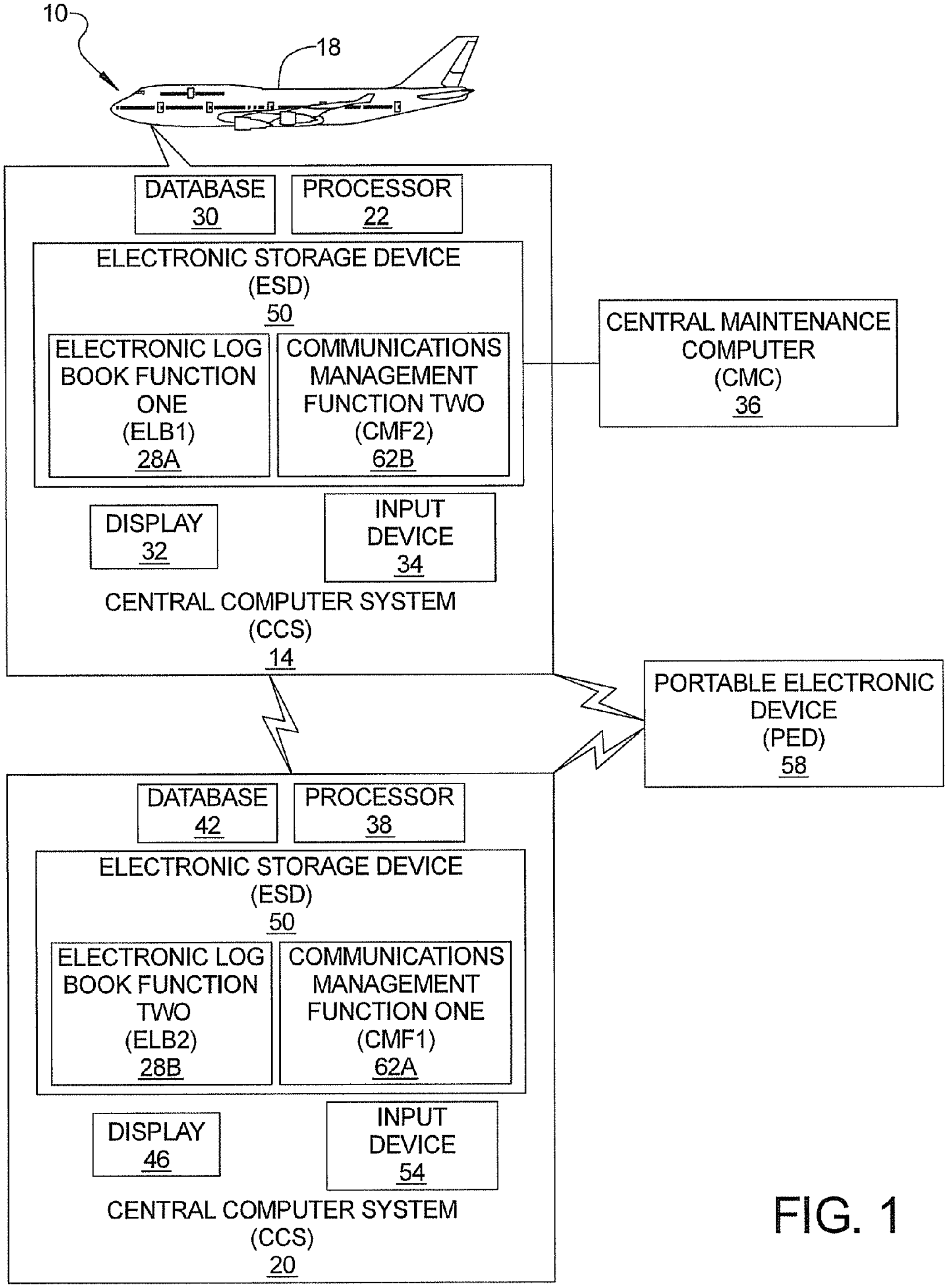
FIG. 1 is a block diagram of a data acquisition and storage system (DASS), in accordance with various embodiments of the present invention.

FIG. 1 is a block diagram of a data acquisition and storage system (DASS) 10, in accordance with various embodiments of the present invention. The DASS 10 includes at least one onboard computer system (OCS) 14 onboard a mobile platform 18 and at least one central computer system (CCS) 20 configured to communicate with the OCS 14. Communications between the OCS 14 and the CCS 20 can be established using any suitable wired or wireless communications link, protocol or service. For example, in various embodiments a wireless connection is established between the OCS 14 and the CCS 20 using GPRS (General Packet Radio Service), VHF, wireless IEEE 802.11 communication and/or satellite networks that implement either Internet or ACARS$^{SM}$ (Airplane Communications and Recording System) protocols. ACARS$^{SM}$ can be provided by ARINC, Inc. of Annapolis, Md. or SITA of Geneva, Switzerland.

The OCS 14 can be a stand alone system or a subsystem of any other system, network or component onboard the mobile platform 18. For example, in various embodiments the OCS 14 is an electronic travel aid utilized by an operator of the mobile platform 18 to enhance ease and efficiency of many tasks the operator must perform during operation of the mobile platform 18. An exemplary electronic travel aid utilized by some airlines is referred to as an electronic flight bag (EFB). Alternatively, the OCS 14 can be a subsystem of an onboard local area network (LAN) or any other onboard mobile platform control system. Although the mobile platform 18 is illustrated as an aircraft, the invention is not limited to aircraft applications. That is, the mobile platform 18 could be any mobile platform such as an aircraft, bus, train or ship.

The OCS 14 includes a processor 22 for executing all functions of the OCS 14 and an electronic storage device (ESD) 26 for electronically storing a first portion 28A of an electronic logbook (ELB) software application 28, and other applications, data, information and algorithms. The first portion 28A of the ELB software application 28 will be referred to herein as simply the ELB1 28A. The OCS 14 additionally includes a database 30. The OCS database 30 is an electronic memory device, i.e. computer readable medium, for storing large quantities of data organized to be accessed and utilized during various operation of the DASS 10. For example, a plurality of look-up tables containing maintenance data, fault data, maintenance procedures and mobile platform metrics may be electronically stored on the OCS database 30 for access and use by the DASS 10 and users of the DASS 10. The OCS ESD 26 can be any computer readable medium device suitable for electronically storing such things as data, information, algorithms and/or software programs executable by the OCS processor 22. For example, the OCS ESD 26 can be a hard drive, a Zip drive, a CDRW drive, a thumb drive or any other electronic storage device. The OCS 14 additionally includes a display 32 for illustrating graphical and textual data, forms and other information, and an input device 34 such as a keyboard, mouse, stylus, touch screen or joy stick for inputting data and information to the OCS 14 to be stored on the OCS ESD 26. It should be understood that the OCS processor, ESD, display and input device 22, 26, 30 and 34 can be components of a stand alone computer based system, i.e. the OCS 14, or components of a larger system, such as an onboard LAN or an onboard mobile platform control system that collectively comprise the OCS 14. Alternatively, the OCS 14 can be a stand alone system that is connectable to a larger system, e.g. an onboard LAN, such that various ones of the OCS processor, ESD, display and input device 22, 26, 30 and 34 are included in the stand alone OCS 14 and others are included in the larger system.

The ELB1 28A is executed and utilized by mobile platform crew to enter mobile platform operation and technical log information and store the log information in the OCS ESD 26, as the mobile platform travels from its origination point to its destination. Operation and technical log information includes such things as mobile platform metrics and fault information regarding the itinerary, schedule and operational performance of the mobile platform. As described further below, the OCS 14 is adapted to communicate the log information to the CCS 20 as the mobile platform 18 is in transit or when the mobile platform reaches a terminal including the CCS 20 at a destination of the mobile platform 18.

Generally, the OCS processor 22 executes the ELB1 28A to communicate with other systems, such as one or more central maintenance computers (CMCs) 36, onboard the mobile platform 18 and generate electronic log forms that are displayed on the OCS display 32. In various embodiments, the log forms include interactive information and data fields for a crew member of the mobile platform to read and/or fill out, utilizing the OCS input device 34, regarding metrics and fault data for the mobile platform. Additionally, the CMC 36 can communicate detected faults to the ELB1 28A and the ELB1 28A will automatically complete various data fields in the log forms so that the crew member can verify, edit, accept or reject the particular logbook entry. A system and method for automatically completing the various data fields in the log forms is described in co-pending patent application titled, "Fault Data Management", Ser. No. 11/199,399, and assigned to The Boeing Company, which is incorporated by reference herein in its entirety. The OCS processor 22 stores the metrics and/or fault data input or accepted by the crew member in the OCS ESD 26 to be downloaded to the CCS 20, as described below.

The CCS 20 includes at least one processor 38, at least one database 42, at least one display 46, at least one electronic storage device (ESD) 50 and at least one input device 54. The CCS display 46 can be any display suitable for visually presenting graphics, text and data to a user of the DASS 10. The CCS input device 54 can be any device adapted to input data and/or information into CCS 20, for example a keyboard, a mouse, a joystick, a stylus, a scanner, a video device and/or an audio device. The CCS ESD 50 can be any computer readable medium device suitable for electronically storing a second portion 28B of the ELB 28, and such other things as data, information and algorithms and/or software programs executable by the CCS processor 38. For example, the CCS ESD 50 can be a hard drive, a Zip drive, a CDRW drive, a thumb drive or any other electronic storage device. The second portion 28B of the ELB 28 will be referred to herein simply as the ELB2 28B.

The CCS database 42 is also an electronic memory device, i.e. computer readable medium, for storing large quantities of data organized to be accessed and utilized during various operation of the DASS 10. For example, a plurality of look-up tables containing maintenance data, fault data, maintenance procedures and mobile platform metrics may be electronically stored on the CCS database 42 for access and use by the DASS 10 and users of the DASS 10. The CCS processor 38 controls all operations of the CCS 20. For example, the CCS processor 38 controls communications, e.g. wired or wireless, and data transfers between the CCS 20 and the OCS 14, displaying graphics and data on the CCS display 46, interpreting and routing information and data input by the CCS input device 54 and the executing various algorithms stored on the CCS ESD 50. Additionally, the CCS processor 38 executes the ELB2 28B to store downloaded data in the CCS database 42.

In various embodiments, the DASS 10 further includes a portable electronic device (PED) 58, e.g. a laptop computer, PDA or any other such device, that communicates with the CCS 20 and/or OCS 14 via a wired or wireless connection. The PED 58 is adapted to access and utilize data stored in the CCS database 42 or the OCS database 30 and also to input data to the CCS 20 or OCS 14 to be stored in the CCS database 42 of OCS database 30 and uploaded to the OCS ESD 26 for utilization by the ELB1 28A, if desirable. The PED 58 displays logbook data in a format suitable for use as a work management tool utilized to return the mobile platform to service. The PED 58 can contain such information and data as lists of required work, e.g. work orders, deferred maintenance actions and unresolved fault reports and any other assigned work found in the CCS database 42 or the OCS database 30

The mobile platform metrics and fault data are downloaded to the CCS 20 so that the data can be shared with mobile platform performance monitoring and maintenance systems (not shown). The mobile platform performance monitoring and maintenance systems may be software applications stored on the CCS ESD 50 or may be separate computer based systems communicatively linked with the CCS 20 and/or the OCS 14. The mobile platform performance monitoring and maintenance systems ensure that regularly scheduled maintenance is performed and that the mobile platform 18 and all systems onboard are maintained in proper operational order. Additionally, the metrics and fault data stored in the CCS database 42 and/or the OCS database 30 can be accessed and utilized, via the PED 58, by maintenance personnel responsible for performing the maintenance and repairs to the mobile platform 18. The metrics and fault data stored in the CCS database 42 and/or the OCS database 30 are synchronized whenever connectivity is established between the OCS 14 and the CCS 20.

The CCS 20 further includes a first portion 62A of a communication management function (CMF) stored on the CCS ESD 50. A second portion 62B of the CMF is stored on the OCS ESD 26. The first and second portions 62A and 62B of the CMF will be respectively referred to herein as the CMF1 62A and the CMF2 62B and collectively referred to here in as the CMF 62. Generally, the CMF 62 provides application program interfaces (APIs) to allow the ELB1 28A and the ELB2 28B to communicate, as described further below.

Figure 2:
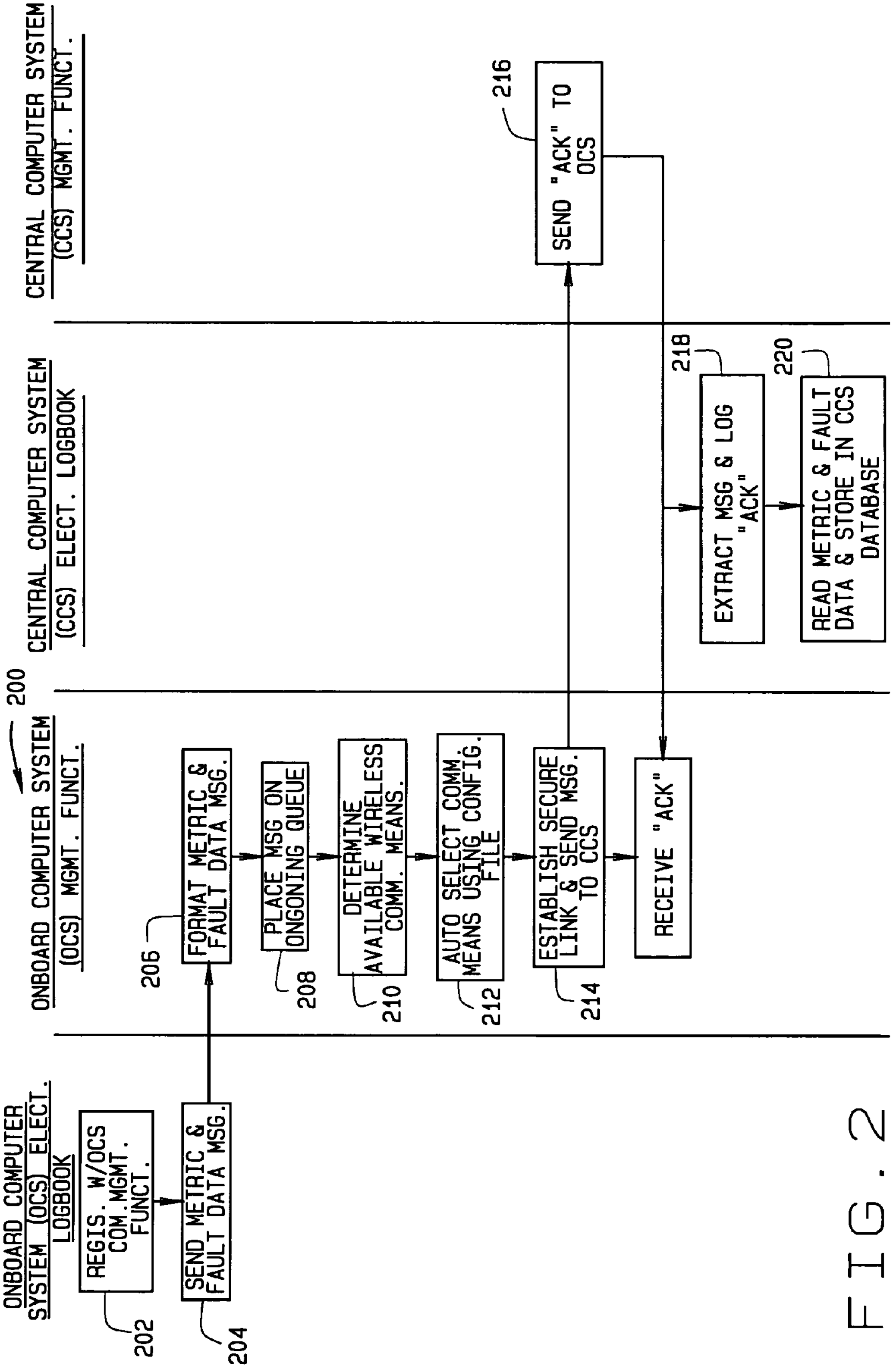
FIG. 2 is a flow chart illustrating an operation of the DASS, whereby metric and fault data is sent from an onboard computer system (OCS) to a central computer system (CCS), shown in FIG. 1, in accordance with various embodiments of the present invention.

FIG. 2 is a flow chart 200 illustrating an operation of the DASS 10 whereby metric and fault data is sent from the OCS 14 to the CCS 20, in accordance with various embodiments of the present invention. Generally, anytime while the mobile platform 18 is en route or when the mobile platform 18 arrives at the destination terminal, a data download operation of the ELB 28 is initiated. Particularly, the CMF2 62B is executed to establish a communication link with the CCS 20 and download the metric and fault data from the OCS ESD 26 to the CCS 20 where the ELB2 28B stores the downloaded data in the CCS database 42. Timing of the data transfer is determined automatically based on logic that segregates communication channels by expense and messages by value as determined by the operator.

More particularly, to initiate communication between the OCS 14 and the CCS 20, the OCS processor 22 executes the ELB1 28A and the CMF2 62B to register the ELB1 28A with the CMF2 62B, as indicated at 202. Once the ELB1 28A is registered with the CMF2 62B, the ELB1 28A sends a message, containing any metric and fault data to be 'downloaded' to the CCS 20, to the CMF2 62B, as indicated at 204. The CMF2 62B then parses the message, generates a unique message identification for the message, converts the message into an encoded data string, and then configures the encoded data string into a transmittable data file so that the metric and/or fault data can be communicated to the CCS 20 using any suitable Internet protocol, as indicated at 206. For example the CMF2 62B can create an extensible markup language (XML) file so that the metric and/or fault data can be communicated to the CCS 20 using any suitable Internet protocol.

The CMF2 62B then places the transmittable data file into a CMF outgoing queue, as indicated at 208. The CMF2 62B can send the message to the CCS 20 via any suitable communication means, e.g. any suitable wired or wireless communication channel. For example, the CMF2 62B can send the message containing the transmittable data file to the CCS 20 using general packet radio service (GPRS), wireless IEEE 802.11, VHF, satellite networks, broadband satellite networks, or a direct wired connection. More specifically, the CMF2 62 includes a configuration file identifying all the desired communication channels the OCS 14 can utilize to communicate with the CCS 20. The number and type of communication channels included in the CMF2 configuration file is application specific and selected by the particular mobile platform provider. For example, a first mobile platform provider may desire to utilize Gatelink IEEE 802.11 and VHF and satellite networks, while a second mobile platform provider may desire to utilize only broadband satellite networks for communication between the OCS 14 and the CCS 20.

More particularly, the CMF2 62B determines and keeps track of what communication channels are available for communication between the OCS 14 and the CCS 20, as indicated at 210. The CMF2 62B automatically selects an appropriate communication channel based on the communication means included in the CMF2 configuration file determined by the operator based on expense of the channel and the value of the message, as indicated at 212. Utilizing the automatically selected communication channel, the CMF2 62B establishes a secure link between the OCS 14 and the CCS 20 and sends the message containing the transmittable data file to CCS 20, via the secure link, as indicated at 214. The CMF2 62B may store more than one message in the CMF outgoing queue and send only those messages that the priority rules, as determined by expense of the channel and value of the message, dictate should be sent via the presently established secure link. The CMF2 62B can then establish another secure link, as described above, using another available channel to send other messages in the CMF outgoing queue that the priority rules deem should be sent by the newly established secure link. If the priority rules and the messages in the CMF outgoing queue do not match any of the available channels, the CMF2 62B will store the messages until the necessary available channels are available.

Furthermore, the CMF2 62B establishes the secure link using any suitable certificate exchange method. For example, the CMF2 62B can establish the secure link utilizing the security certificate management method described in the co-pending patent application titled "Security Certificate Management", Ser. No. 11/191,622, and assigned to the Boeing Company, which is incorporated herein by reference. Once the CMF2 62B sends the message containing the transmittable data file to CCS 20 over the secure link, the CCS processor 38 executes the ELB2 28B and the CMF1 62A to send an 'ACK' message to the OCS 14 acknowledging receipt of the message containing the transmittable data file, as indicated at 216. The CMF1 62A receives a call-back from an offline client for the message received, and the ELB2 28B extracts the fault and metric data message from the transmittable data file and logs the 'ACK', as indicated at 218. Once the CMF1 62A sends the 'ACK' message to the OCS 14, the ELB2 28B reads the metric and fault data from the extracted message and stores the metric and fault data in the CCS database 42, as described at 224.

Figure 3:
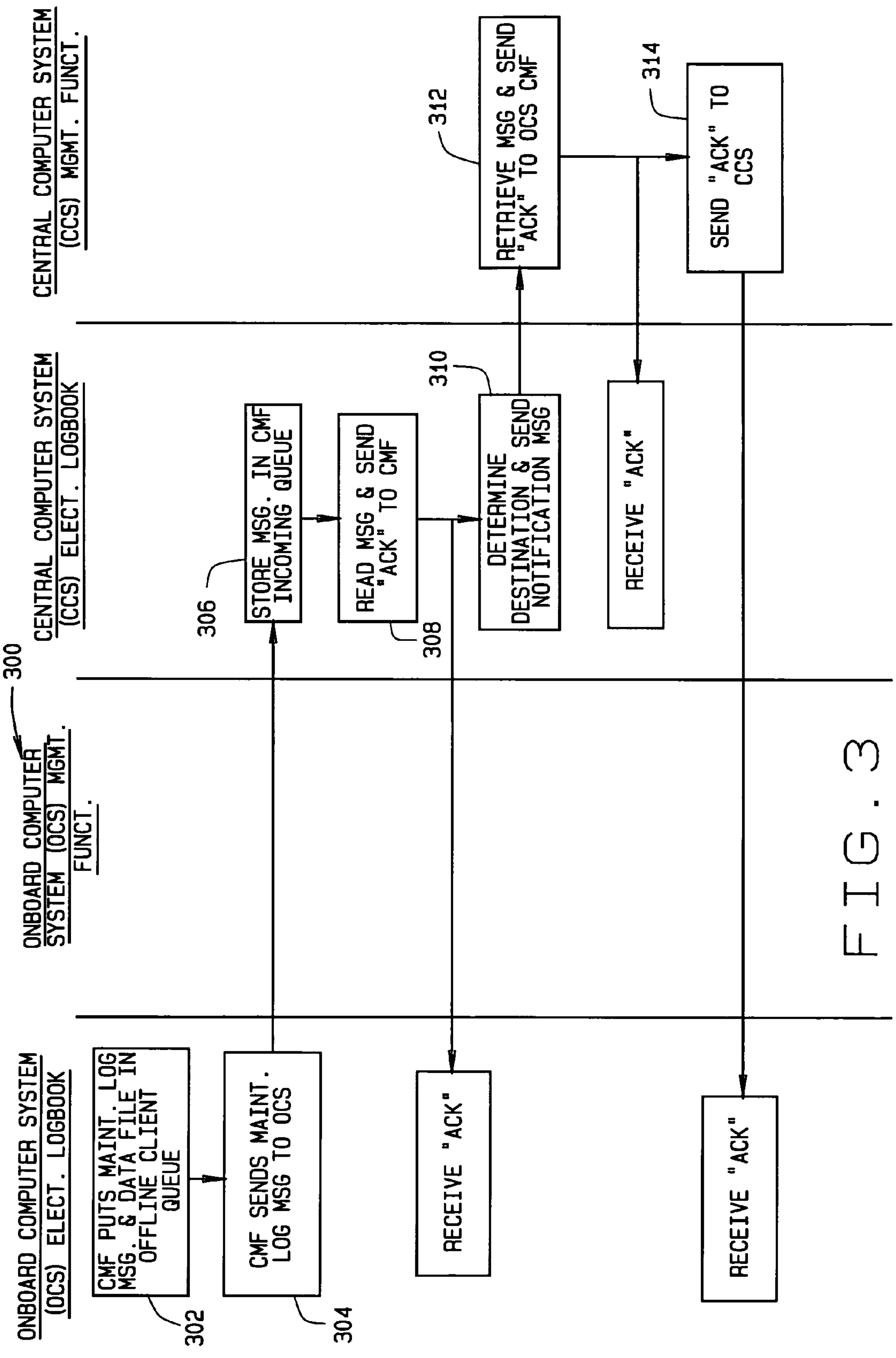
FIG. 3 is a flow chart illustrating an operation of the DASS, whereby the CCS sends maintenance log data to the OCS, in accordance with various embodiments of the present invention.

FIG. 3 is a flow chart 300 illustrating an operation of the DASS 10, whereby the CCS 20 sends maintenance log data, including such data as maintenance actions data and maintenance release data, to the OCS 14, in accordance with various embodiments of the present invention. The metric and fault data received from the OCS 14 and stored in the CCS database 42 is accessible by mobile platform maintenance personnel, via the PED 58. Additionally, once the maintenance personnel have completed maintenance repair, upgrades and/or checks in accordance with the metric and fault data retrieved from the CCS database 42, the maintenance personnel can enter and store the maintenance log data in the CCS database 42, via the PED 58. Once the maintenance log data is stored in the CCS database 42, the CMF1 62A puts a maintenance log message containing a transmittable data file including the maintenance log data in an offline client queue, as indicated at 302. For example, the CMF1 62A could put the maintenance log message containing an extensible markup language (XML) file including the maintenance log data in the offline client queue.

Next, the CMF1 62A sends the maintenance log message to the OCS 14, via the secure link, as indicated at 304. The CMF2 62B receives the message containing the transmittable data file including the maintenance log data and stores the message in a CMF incoming queue, as indicated at 306. The CMF2 62B reads the received message and sends an 'ACK' message to the CMF1 62A, as indicated at 308. Based on information in the received maintenance log message, the CMF2 62B determines an appropriate destination, e.g. an appropriate application executable by the OCS processor 22, and sends a notification message, as indicated at 310. The appropriate application retrieves the message and sends an 'ACK' to the CMF2 62A, as indicated at 312. Finally, the appropriate application additionally sends an 'ACK' to the CMF1 62A, as indicated at 314. The exchange of 'ACKs' indicated at 312 and 314 ensure the appropriate synchronization of data between the CCS database 42 and the OCS database 30.

The DASS 10 provides rapid and human intervention-less movement of data by use of communication channels, e.g. wired or wireless, and improved availability of logbook data, thereby improving operational efficiency and reducing labor costs and other operating costs, e.g. schedule delays, of moving the metric and fault data to mobile platform health maintenance systems, e.g. the CCS 20 or other network connected to the CCS 20, in a timely fashion. Additionally, the DASS 10 coordinates and synchronizes the metric and fault data between the OCS 14, the CCS 20 and the PED 58 and enables near real-time status on the health of a particular mobile platform while it is en route.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A method for establishing a communication link between a mobile platform and a remote computer system, said method comprising:

using a first electronic log book (ELB) component of a mobile platform onboard computer system (OCS) to obtain information pertaining to at least one of:

an itinerary of the mobile platform; an operational parameter of the mobile platform; and fault information concerning operation of a component of the mobile platform;

using the first ELB component to generate a data file from said information;

placing the data file into an outgoing queue of a communications management function of the OCS;

configuring the data file into a transmittable data file;

locating a second electronic log book (ELB) component on a remote central computer system (CCS);

selecting a type of communication channel between the OCS and the remote CCS from a plurality of different types of communication channels adapted to work with differing communications protocols, when the data file is placed into the outgoing queue, the selection being made based on expense of the selected type of communication channel and a value of the data contained in the data file;

transmitting the data file from the OCS to the CCS, via the selected communication channel;

using the second ELB component to provide information that may be transmitted at a desired time via the CCS to the OCS; and wherein configuring the data file into the transmittable data file comprises at least:

generating a unique message identification for a message of the data file; and encoding the message.

2. The method of claim 1, wherein configuring the message into the transmittable data file comprises all of:

parsing the message;

generating the unique message identification for the message; and converting the message into an encoded data string.

3. The method of claim 1, further comprising storing the data file in the OCS if a desired communication channel is not available.

4. The method of claim 1, further comprising sending an acknowledgement message from the CCS to the OCS acknowledging receipt of the message.

5. The method of claim 1, further comprising:

extracting metric and fault data from the data file, utilizing an electronic log book function of the CCS; and storing the data in a database of the CCS.

6. A communications system for use with a mobile platform, the system comprising:

an electronic log book (ELB) application having a first ELB application and a second electronic log book (ELB) application;

an onboard computer system (OCS) carried on the mobile platform and including the first ELB application, for transmitting data to a remote central computer system (CCS);

the CSS including the second ELB application which is in communication with a CCS communication management application of the CCS;

the OCS further comprising:

a storage device;

the first ELB application residing on the storage device and being compatible with the second ELB application residing on the CCS;

an OCS communication management application residing on the storage device that is compatible with the CCS communication application, and being configured to manage an outgoing queue and a plurality of different types of communication channels between the OCS and the CCS;

an OCS processor in communication with the storage device and adapted to execute the OCS first ELB application and the OCS communication management application to:

send a message containing data to be downloaded to the CCS from the OCS first ELB application to the OCS communication management application;

configure the message into a transmittable data file;

place the transmittable data file into an outgoing queue of the OCS communication management application;

select at least one type of communication channel from a plurality of available differing types of communication channels, the selection being based on expense of the selected type of communication channel and on a plurality of priority rules relating to a content of the message about to be transmitted;

transmit the transmittable data file containing the data message from the OCS communication management application to the CCS communication management application, via the selected communication channel;

the CCS being operable to transmit data obtained from the second ELB application to the OCS; and wherein to configure the data message into the transmittable data file the OCS processor is adapted to execute the OCS first application and the OCS communication management application to:

parse the message;

generate a unique message identification for the message; and convert the message into an encoded data string.

7. The system of claim 6, wherein the OCS processor is further adapted to execute the OCS first ELB application and the OCS communication management application to place a plurality of messages on the OCS communication management application outgoing queue and send the messages to the CCS communication management application based on the priority rules included in the OCS communication management application.

8. The system of claim 7, wherein the OCS processor is further adapted to execute the OCS first ELB application and the OCS communication management application to establish a second secure link using a second available communication channel to send at least one of the messages based on the priority rules.

9. The system of claim 6, wherein the OCS processor is further adapted to execute the OCS communication management application to store the message in the OCS if a specific one of the plurality of available differing types of communication channels is not available.

10. The system of claim 6, wherein the CCS is adapted to send an acknowledgement message to the OCS acknowledging receipt of the message.

11. The system of claim 6, wherein the CCS is adapted to extract the data from the transmittable data file and store the data in a database of the CCS.

12. The system of claim 6, wherein to select the communication channel the OCS processor is adapted to execute the OCS first ELB application and the OCS communication management application to determine and track at least one communication channel available for communication between the OCS and the CCS.

13. A mobile platform comprising:

an onboard computer system (OCS) having a first electronic log book (ELB) application, for transmitting data to a remote central computer system (CCS), wherein the CSS includes a CCS having a second ELB application and a CCS communication management application;

the OCS comprising:

a storage device;

the second ELB application residing on the storage device that is compatible with the CCS second ELB application;

an OCS communication management application residing on the storage device that is compatible with the CCS communication application, and being adapted to manage an outgoing queue and a plurality of communication channels between the OCS and the CCS;

an OCS processor in communication with the storage device and adapted to execute the OCS first ELB application and the OCS communication management application to:

send a message containing data to be downloaded to the CCS from the OCS first ELB application to the OCS communication management application;

configure the message into a transmittable data file;

place the transmittable data file into an outgoing queue of the OCS communication management application;

automatically select at least one type of communication channel from a plurality of different available types of communication channels, based on a plurality of priority rules concerning the content of the message and based on an expense of the selected communication channel;

transmit the transmittable data file containing the data message from the OCS communication management application to the CCS communication management application, via the selected communication channel;

receive a data file from the second ELB application via a signal sent from the CCS communication management application, via the selected channel; and wherein to configure the message into the transmittable data file the OCS processor is adapted to execute the OCS first ELB application and the OCS communication management application to:

parse the message;

generate a unique message identification for the message; and convert the message into an encoded data string.

14. The mobile platform of claim 13, wherein the OCS processor is further adapted to execute the OCS first ELB application and the OCS communication management application to place a plurality messages on the OCS communication management application outgoing queue and send the messages to the CCS communication management application based on the priority rules included in the OCS communication management application.

15. The mobile platform of claim 14, wherein the OCS processor is further adapted to execute the OCS first ELB application and the OCS communication management application to establish a second secure link using a second available communication channel to send at least one of the messages based on the priority rules.

16. The mobile platform of claim 13, wherein the OCS processor is further adapted to execute the OCS communication management application to store the message in the OCS if a selected one of the plurality of differing available types of communication channels is not available.

17. The mobile platform of claim 13, wherein to automatically select the communication channel the OCS processor is adapted to execute the OCS first ELB application and the OCS communication management application to determine and track at least one of the plurality of differing available types of communication channels available for communication between the OCS and the CCS.

18. The method of claim 6, wherein:

at least one of the plurality of priority rules relates to a cost or a value of the data of the message to be transmitted.

* * * * *